(12) United States Patent
Kotefski et al.

(10) Patent No.: US 8,596,290 B2
(45) Date of Patent: Dec. 3, 2013

(54) PRESSURE DISCHARGE VALVE FOR STORAGE TANKS

(76) Inventors: Stojan Kotefski, Bloomingdale, NJ (US); Eugene R Reda, West Milford, NJ (US)

( * ) Notice: Subject to any disclaimer, the term of this patent is extended or adjusted under 35 U.S.C. 154(b) by 273 days.

(21) Appl. No.: 13/107,486

(22) Filed: May 13, 2011

(65) Prior Publication Data

US 2012/0285956 A1   Nov. 15, 2012

(51) Int. Cl.
   *F16K 17/14*   (2006.01)
(52) U.S. Cl.
   USPC .................... 137/72; 137/74; 220/89.4
(58) Field of Classification Search
   USPC .................... 137/72, 73, 74; 220/89.4
   See application file for complete search history.

(56) References Cited

U.S. PATENT DOCUMENTS 2,271,786 A * 2/1942 Watkins ................. 137/73
5,240,027 A * 8/1993 Vertanen ................ 137/73

* cited by examiner

*Primary Examiner* — Kevin Lee
*Assistant Examiner* — Macade Brown

(57) ABSTRACT

A pressure discharge valve for storage tanks on land or trucks including a valve body having a through hole therein adapted to mate and communicate with a through hole in a wall of the storage tank, a first vent means comprised of a eutectic composition which automatically provides a partial release of storage tank liquid at a first predetermined temperature lower than critical combustion and/or explosive temperatures of liquid in the storage tank, to provide a visual signal and warning to firefighters of these hazardous conditions, and a second vent means comprised of a eutectic composition to automatically vent liquid in the storage tank through the hole in the valve body when the liquids therein reach a predetermined critical temperature. In addition, the pressure discharge valve preferably comprises a eutectic solder material disposed between the valve body and the second vent means, which changes phase (i.e., reaches its eutectic point) below the eutectic point of the second vent means, thereby providing a lubricant between the plug and the valve body.

12 Claims, 4 Drawing Sheets

PRESSURE DISCHARGE VALVE FOR STORAGE TANKS

BACKGROUND OF THE INVENTION

1. Field of the Invention

The present invention relates in general to a pressure discharge valve for storage tanks containing petroleum products, acid, liquefied gases, and other flammable liquids and, more particularly, to a pressure discharge valve comprised of a eutectic composition designed to automatically vent when the contents of the storage tank reaches a predetermined dangerous temperature lower than a critical vent temperature.

2. Description of the Related Art

In general, storage tanks such as fuel tanks have operating temperatures between −60° F. to 160° F. In case of a fire, the temperature of the storage tank(s) rises beyond a safe operating temperature of, for example, 160° F., and the liquid contained inside the tank expands and creates an internal pressure (Hoop Pressure). At a certain point, as the internal pressure increases, the tank ruptures and creates a high order explosion.

If this hoop pressure were to be relieved, the high order explosion can be reduced to a low order reaction. These storage tanks can contain fuel oil, acid, liquefied gases and other types of materials that have a flash point, detonation or volatile ignition temperature that makes them unsafe for firefighters. A low order reaction still has a flame and fire associated with it, but it does not explode. By eliminating the explosion characteristic of storage tanks, firefighters can more effectively extinguish fires.

Conventional pressure relief valves typically vent the contents of a fuel tank when the pressure in the tank reaches a critical condition. However, conventional pressure relief valves do not provide a warning to firefighters as to when a burning storage tank is in a critical and an unsafe mode for firefighting efforts.

It is therefore an object of the present invention to provide a pressure discharge valve for storage tanks containing flammable and/or explosive liquids having a valve which automatically opens and vents said liquids before the temperature and/or pressure in the tank causes the tank to rupture, and/or resulting in a high order detonation.

It is another object of the present invention to provide a pressure discharge valve which minimizes and/or eliminates high order detonations of fuel tanks.

It is still another object of the present invention to provide a pressure discharge valve for fuel storage tanks which provides a signal to firefighters of an unsafe condition of the fuel storage tank.

It is yet another object of the present invention to provide a pressure discharge valve which will warn firefighters that the storage tank has reached a critical condition, and that rupture and/or detonation thereof may be imminent.

BRIEF SUMMARY OF THE INVENTION

After considerable investigation and research, the pressure discharge valve of the present invention was unexpectedly discovered. In particular, a pressure discharge valve for storage tanks containing flammable and/or explosive liquids was unexpectedly discovered which automatically opens and vents said liquids before the temperature and/or pressure in the tank causes the tank to rupture, and which may otherwise cause a high order detonation.

Additionally, the pressure discharge valve of the present invention also signals firefighters of an unsafe condition in the fuel tank which could cause injury and/or death to firefighters/first responders. This signal, which precedes the automatic opening of the pressure discharge valve, also warns the firefighters that the contents of the storage tank have reached a critical condition and that rupture and/or detonation may be imminent.

Accordingly, in a first preferred embodiment, there is provided a pressure discharge valve for storage tanks comprising:
  (a) valve body means having a through hole (vent hole) disposed therethrough, said valve body operable to mate and communicate with a through hole in a wall of the storage tank;
  (b) a first vent means which automatically provides a partial release of storage tank liquid and/or gases at a first predetermined temperature lower than critical combustion and/or explosive temperatures of liquid in the storage tank, said first vent means providing a visual signal and warning to firefighters of hazardous conditions that rupture of the storage tank or explosion of liquid in the storage tank is imminent; and
  (c) a second vent means operable to vent liquids in said storage tank through the hole in the valve body means when the liquids therein reach a predetermined critical temperature.

In a second preferred embodiment, there is provided in connection with the first preferred embodiment a pressure discharge valve in which a temperature differential between venting of the first vent means and the second vent means can be adjusted to provide a specific time/temperature interval to provide safer conditions for firefighters.

In a third preferred embodiment, there is provided in connection with the first preferred embodiment a pressure discharge valve in which a flange means is provided on the valve body means to aid in affixing the valve body means to the storage tank.

In a fourth preferred embodiment, there is provided in connection with the first preferred embodiment a pressure discharge valve which further comprises a plug means adapted to be connected in threaded engagement with the valve body means, whereby to close the through hole therein until the temperature of fluids in the storage tank reaches a critical predetermined temperature.

In a fifth preferred embodiment, there is provided in connection with the fourth preferred embodiment a pressure discharge valve in which the first vent means further comprises a vent hole in said plug means to facilitate a partial release of fluids from the storage tank to the atmosphere.

In a sixth preferred embodiment, there is provided in connection with the fifth preferred embodiment a pressure discharge valve in which the vent hole in the first vent means is provided with a plug formed of a vent eutectic which seals the vent hole until a first predetermined temperature is reached when it becomes necessary to warn firefighters of hazardous temperatures in the storage tank.

In a seventh preferred embodiment, there is provided in connection with the sixth preferred embodiment a pressure discharge valve in which said vent eutectic changes from a solid to a liquid over a predetermined temperature range, thereby melting the solid plug (vent eutectic) from the vent hole which results in a partial release of liquids from said first vent means.

In an eighth preferred embodiment, there is provided in connection with the seventh preferred embodiment a pressure discharge valve in which the vent eutectic is one or more selected from the group consisting of $Bi_{58}Pb_{42}$, $In_{52}Sn_{48}$, $In_{74}Cd_{26}$, and $In_{50}Sn_{50}$.

In a ninth preferred embodiment, there is provided in connection with the fourth preferred embodiment a pressure discharge valve in which the valve body means has a round through hole which has a smaller diameter in contact with the storage tank than at the discharge end of the pressure valve, and a shoulder formed where the diameter of the through hole becomes larger.

In a tenth preferred embodiment, there is provided in connection with the ninth preferred embodiment a pressure discharge valve in which the smaller discharge hole in the valve body means is threaded.

In an eleventh preferred embodiment, there is provided in connection with the tenth preferred embodiment a pressure discharge valve in which the plug means conforms in size and shape to the round through hole in the valve body means, and fits in sealing engagement therewith when in threaded engagement with the valve body means, and when a shoulder on the through hole of the valve body means is in sealing engagement with a corresponding shoulder formed on the plug means.

In a twelfth preferred embodiment, there is provided in connection with the ninth preferred embodiment a pressure discharge valve in which the second vent means further comprises a hole extending through the valve body means and into said plug means.

In a thirteenth preferred embodiment, there is provided in connection with the twelfth preferred embodiment a pressure discharge valve in which the second vent means further comprises an anti-rotational solid plug in the hole extending through the valve body means and into the plug means, said anti-rotational solid plug changes phase from solid to liquid when liquid in the storage tank reaches a predetermined critical temperature, at which time internal pressure in the storage tank causes the plug means to rotate until no longer in threaded engagement with the valve body means and forced out of the valve body means, thus fully opening the valve and relieving excess pressure in the storage tank.

In a fourteenth preferred embodiment, there is provided in connection with the thirteenth preferred embodiment a pressure discharge valve in which the solid anti-rotational plug is formed from one or more eutectic compositions selected from the group consisting of $Bi_{58}Sn_{42}$, $Bi_{57}Sn_{42}Ag_1$, and $Sn_{51.2}Pb_{30.6}Cd_{18.2}$.

In a fifteenth preferred embodiment, there is provided a pressure discharge valve for storage tanks comprising:
(a) valve body means having a through hole therein adapted to mate and communicate with a through hole in a wall of the storage tank;
(b) a first vent means which automatically provides a partial release of storage tank liquids at a first predetermined temperature lower than critical combustion and/or explosive temperatures of said liquids in the storage tank, providing a visual signal and warning to firefighters of hazardous conditions that rupture of the storage tank or explosion of liquid in the storage tank is imminent;
(c) a second vent means which automatically vents liquid in said storage tank through the hole in the valve body means when the liquid in the storage tank reaches a predetermined critical temperature, and
(d) a plug means adapted to be connected in threaded engagement with the valve body means, whereby to close the through hole therein until the temperature of fluid in the storage tank reaches a critical temperature,
said first vent means further comprising a vent hole extending through said plug means to facilitate a partial release of fluids from the storage tank to the atmosphere, the vent hole in the first vent means being provided with a plug formed of a vent eutectic which seals the vent hole until a first predetermined temperature is reached when it becomes necessary to warn firefighters of hazardous temperatures in the storage tank, said vent eutectic changing from a solid to a liquid over a predetermined temperature range, thereby melting the solid plug and opening the vent hole which results in a partial release of liquids from said first vent means, said valve body means having a round through hole which has a smaller diameter in contact with the storage tank than at the discharge end of the pressure valve, with a shoulder being formed where the diameter of the through hole becomes larger, the smaller discharge hole in the valve body means being threaded, said plug means conforming in size and shape to the round through hole in the valve body means, and fitting in sealing engagement therewith when in threaded engagement with the valve body means when a shoulder on the through hole of the valve body means is in sealing engagement with a corresponding shoulder formed on the plug means, said second vent means further comprising a hole extending through the valve body means and into said plug means, said second vent means further comprising an anti-rotational solid plug in the hole extending through the valve body means and into the plug means, said anti-rotational solid plug changing phase from solid to liquid when the liquid in the storage tank reaches a predetermined critical temperature, at which time internal pressure in the storage tank causes the plug means to rotate until no longer in threaded engagement with the valve body means and is forced out of the valve body means, thus fully opening the valve and relieving excess pressure in the storage tank.

In a sixteenth preferred embodiment, there is provided in connection with the fifteenth preferred embodiment a pressure discharge valve in which the vent eutectic is one or more selected from the group consisting of $Bi_{58}Pb_{42}$, $In_{52}Sn_{48}$, $In_{74}Cd_{26}$, and $In_{50}Sn_{50}$.

In a seventeenth preferred embodiment, there is provided in connection with the fifteenth preferred embodiment a pressure discharge valve in which the solid anti-rotational plug is formed from one or more eutectic compositions selected from the group consisting of $Bi_{58}Sn_{42}$, $Bi_{57}Sn_{42}Ag_1$, and $Sn_{51.2}Pb_{30.6}Cd_{18.2}$.

In an eighteenth preferred embodiment, there is provided in connection with the fifteenth preferred embodiment a pressure discharge valve in which a temperature differential between venting of the first vent means and the second vent means is adjustable so as to provide a specific time interval from safe to hazardous conditions for firefighters.

In a nineteenth preferred embodiment, there is provided in connection with the fifteenth preferred embodiment a pressure discharge valve in which a flange means is provided on the valve body means to aid in affixing the valve body means to the storage tank.

In a twentieth preferred embodiment, there is provided a pressure discharge valve for storage tanks comprising:
a circular valve body having an outwardly extending flange at a base of the body, said flange adapted to mount the valve on to a surface of a storage tank, said circular body having a round bore hole therein concentric with a longitudinal axis of the circular body, said circular bore hole having a larger diameter in an upper portion of the circular body than in a lower portion of the circular body, with a shoulder being formed in the bore hole where the diameter of the bore hole changes, an inside surface of the lower bore hole having threads formed therein, and one or more bore holes being formed in the circular body perpendicular to the longitudinal axis of the circular body, a solid plug having a larger diameter at a top portion than at a lower portion thereof and being adapted to fit in sealing engagement with surfaces of the bore hole formed in the circular body, said plug having threads formed on a lower portion thereof which are adapted to operate in threaded engagement with threads on a lower portion of the bore hole in the circular body, a second bore hole formed in the solid plug which is in coincidence and alignment with said bore hole formed in an upper portion of the circular body;

a solid anti-rotation eutectic pin inserted/disposed in the plug to prevent rotation of the plug relative to the circular valve body at safe temperatures, said anti-rotation eutectic pin operable to automatically change phase to a liquid at critical temperature, thereby permitting the plug to rotate upwardly and out of threaded engagement with the circular valve body whereby to open the valve, wherein said plug has a small through hole extending from the tank wall with a first eutectic plug or pin in sealing engagement therein, said eutectic plug or pin being solid at safe temperature conditions but operable to change phase to a liquid at or near critical conditions whereby to release a small stream of liquid to the atmosphere to warn firefighters of imminent danger.

In a twenty first preferred embodiment, there is provided in connection with the first, fifteenth and twentieth preferred embodiments, a pressure discharge valve further comprising a eutectic sodder material disposed between the plug and valve body/valve body means, said eutectic sodder material being solid at normal operating temperatures but operable to change phase to a liquid at or near critical conditions, thereby acting as a lubricant in decreasing frictional resistance between the plug and valve body.

In a twenty second preferred embodiment, the pressure discharge valve of the twenty first embodiment is provided, wherein the eutectic solder material has a eutectic point between a eutectic point of the first vent means and the second vent means.

In a twenty third preferred embodiment, the pressure discharge valve of the twenty first embodiment is provided, wherein the eutectic solder material is comprised of one or more selected from the group consisting of $Bi_{58}Pb_{42}$, $In_{52}Sn_{48}$, $In_{74}Cd_{26}$, and $In_{50}Sn_{50}$.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
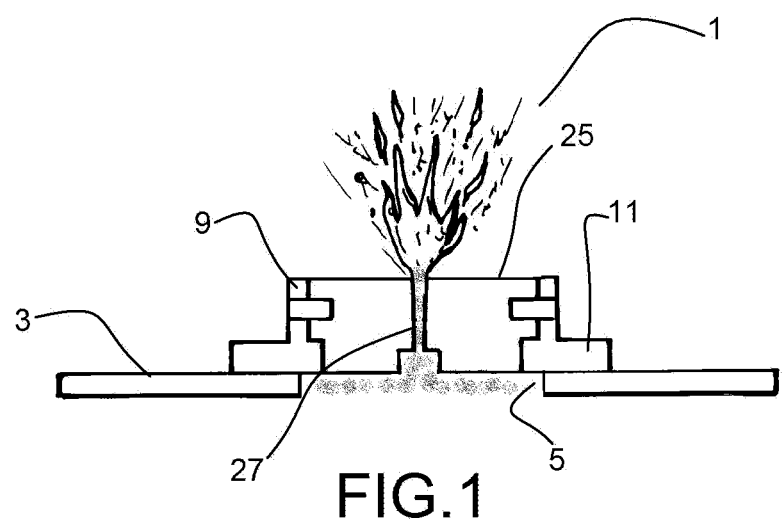
FIG. 1 is a partial cross-sectional view of a wall of a fuel tank having a pressure discharge valve of the present invention mounted thereon and, particularly illustrating, a small liquid stream issuing from the valve to provide a signal and warning to firefighters of an approaching critical temperature of the contents of the tank.
Figure 2:
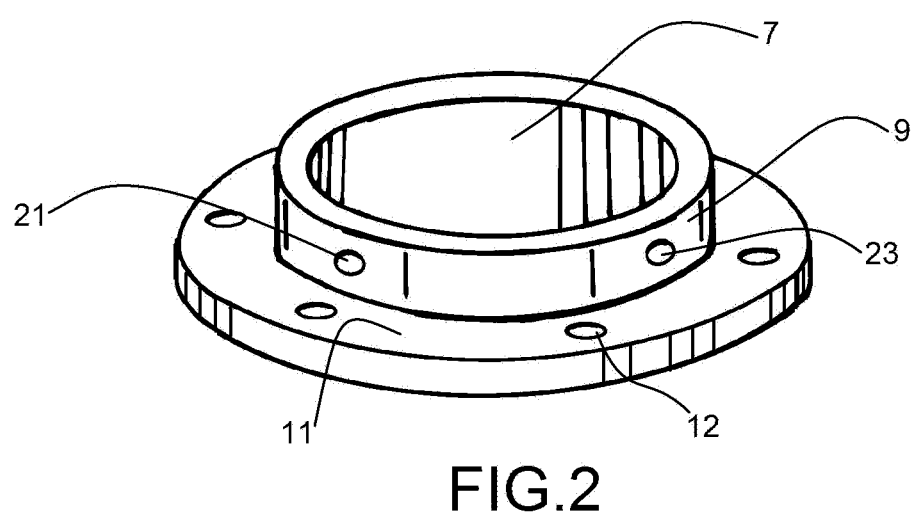
FIG. 2 is a perspective view of a flanged valve body used in the pressure discharge valve of the present invention, illustrating holes in the flange used to affix the valve to a wall of the storage tank, and holes through the side of the valve body into which anti-rotation eutectic pins can be inserted to prevent rotation of a plug closing the valve.
Figure 3:
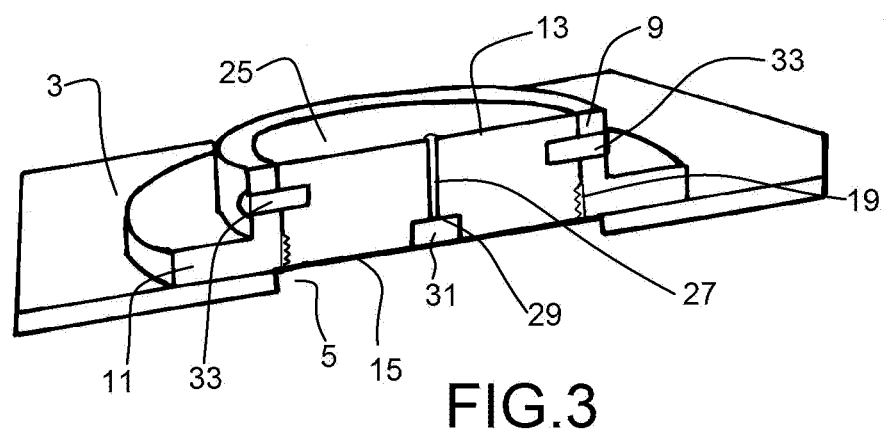
FIG. 3 is a perspective view of the cross-section of the pressure discharge valve of the present invention shown in FIG. 1, particularly illustrating the plug held and in threaded engagement with the valve body, and the holes extending through the side of the valve body and into the plug into which can be inserted anti-rotation eutectic pins.

The pressure discharge valve of the present invention is shown generally at 1 in FIG. 1, mounted on wall 3 of a storage tank for flammable or explosive fuels (not shown). A hole 5 in storage tank wall 3 communicates with a bore hole 7 (FIGS. 2 and 5) formed in body 9 of valve 1 (FIGS. 1, 2, 6, and 7). A flange 11 is shown connected to or formed integral with valve body 9 (FIGS. 1-7), the purpose of flange 11 being to facilitate the mounting of valve 1 on wall 3 of a storage tank. Holes 12 through flange 11 can be used in mounting valve 1 (FIGS. 2-4).

The bore hole 7 through valve body 9 has a larger diameter 13 at an outer or discharge end than at a lower or entry end 15 which is in contact with the fuel tank (see FIGS. 3-7). As shown in FIGS. 3-7, a shoulder 17 is formed on an inner surface of bore hole 7 where the bore hole changes diameter. Threads 19 are formed on an inner surface of the smaller diameter bore hole 15 in valve body 9 (FIGS. 3-7). Small bore holes 21, 23 are drilled or otherwise formed in a wall of valve body 9 (FIGS. 2-5) and into plug 25 (FIGS. 1, 3-5, and 7).

Plug 25, which may be formed of a metal or other material having sufficient strength and chemical resistance to operate in the operating environment, has a vent hole 27 extending through the plug 25, and vent hole 27 is enlarged at its lower end 29 closest to the fluids (fuels) in the storage tank (see FIGS. 1 and 3-5). A eutectic plug or pin (vent eutectic) 31 fits in sealing engagement with walls of the lower end 29 of vent hole 27 (see FIGS. 1-5). The eutectic plug or pin 31 is formed of a eutectic composition, and can be selected to correspond to unsafe temperatures of any particular fluids to be used in the storage tanks.

Figure 4:
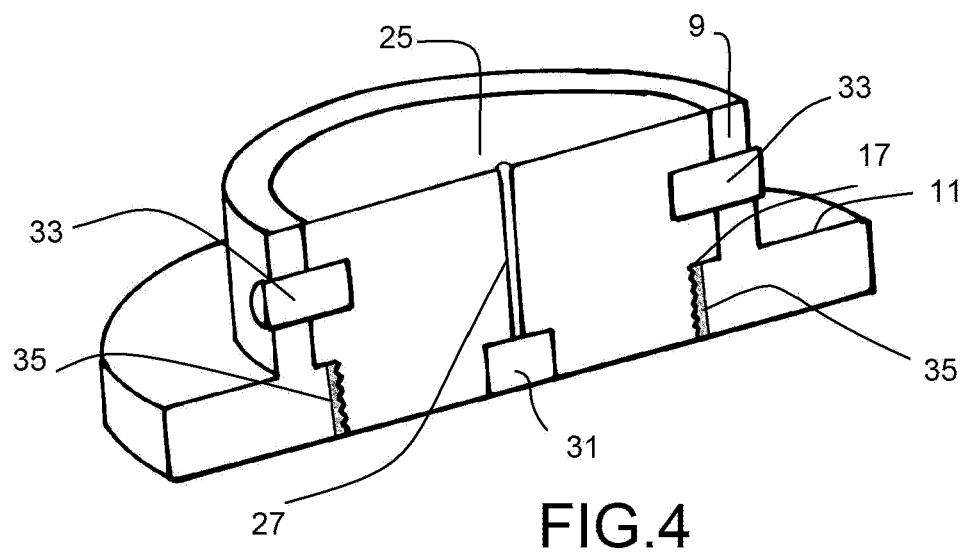
FIG. 4 is a cross-sectional perspective view of the pressure discharge valve of the present invention, illustrating the holes or recesses into which eutectic plugs or pins can be inserted, as well as the threaded engagement of the valve body with the plug through which a small quantity of fuel is automatically released to signal and warn firefighters of imminent danger.
Figure 5:
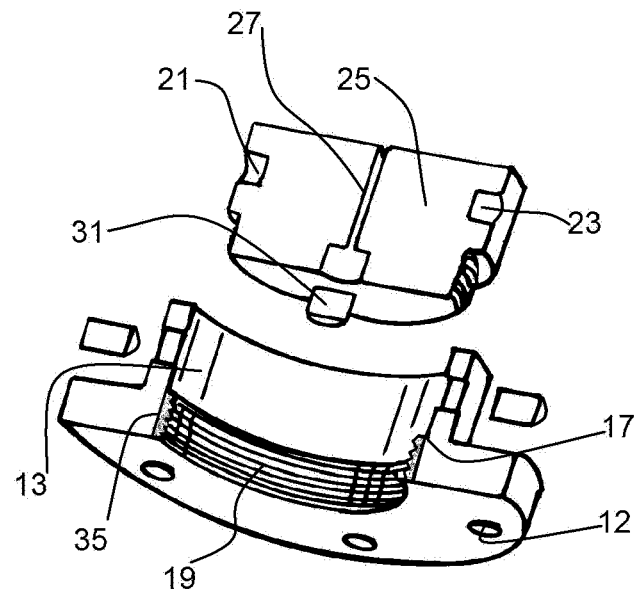
FIG. 5 is an exploded perspective view of the components of the pressure discharge valve of the present invention, particularly illustrating the eutectic pins or pugs used for closing both the valve warning system and the main discharge system for the valve, as well as the eutectic solder material.
Figure 6:
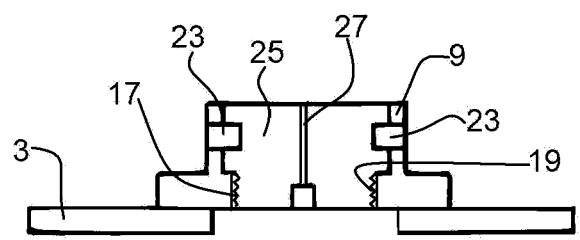
FIG. 6 is a cross-sectional view of a fuel tank with the pressure discharge valve of the present invention mounted thereon, illustrating the position of components of the valve when the valve is in a closed position.
Figure 7:
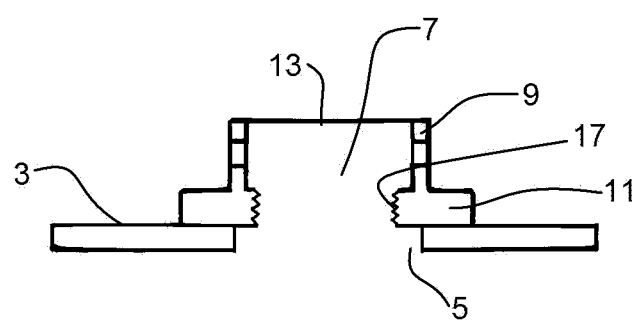
FIG. 7 is a cross-sectional view of a fuel tank with the pressure discharge valve of the present invention mounted thereon, illustrating the position of the valve components when the valve is open.

Further, as shown in FIGS. 4 and 5, anti-rotation eutectic plugs or pins 33 are inserted in sealing engagement with surfaces of bore holes 21, 23 to prevent plug 25 from rotating outwardly, and thereby opening valve 1. Like the vent eutectic plug or pin 31, the anti-rotation plugs or pins 33 are formed of one or more eutectic compositions, which is selected by the user to correspond to unsafe temperatures of any particular fluids to be used in the storage tanks. Preferably, the anti-rotation eutectic plug or pin 33 is formed of a eutectic composition having a higher eutectic point than the eutectic composition making up the plug or pin 31, so that the vent eutectic plug or pin 31 is first to fail (i.e., change phase), thereby providing the first warning. Then, when the eutectic point of the anti-rotation plug or pin 33 is reached, plug or pin 33 changes phase, thereby allowing the plug 25 to be released (i.e., allowed to rotate out) from the valve body 9.

Additionally, there is a eutectic solder material 35 located adjacent the thread joint 15,19 that is used to seal the thread joint from fluid or material flow under normal operating conditions. The eutectic solder material 25, when exposed to temperatures above the melting temperatures above the Eutectic Pin (Vent Eutectic) 31 but less then the Anti-rotation pins 33. In addition to the sealing capability of this thread eutectic solder composition, it also serves to strengthen the mechanical strength of the anti-rotation capability of the thread joint 15,19 under normal operating conditions. Once the temperature goes beyond the thread joint eutectic composition's melting point, the eutectic solder composition in liquid form acts as a lubricant for the thread joint, when the anti-rotation pins 21 phase change or melt. The pressure discharge valve of the present invention vents a storage tank when the temperature exceeds a certain temperature above normal environmental temperature changes (universally −65 to 160° F. which is a conventional design criteria). In this case, the pressure discharge valve preferably vents or opens when the external temperature is at or above a temperature of 250° F. At this temperature, it is safe to assume that it is not natural stimuli increasing the temperature, and that a fire, electrical malfunction, undesired heat source or other unexpected heat generation is occurring. In this case, the internal pressure of the storage tank needs to be relieved and the contents at least partially discharged (for fuel oil, a piping system is preferred to transfer fuel to a safe location). The pressure discharge of the present invention valve can accomplish this objective.

The flange 11 serves as the support structure of the pressure discharge valve 1. It is used as the attachment means for holding the valve onto the storage tank. Additionally, it also supports the solid plug 25 via the thread joint 15, 19. The thread joint 15, 19, may be a conventional thread joint, or a guide release thread, such as a three pitch thread. During normal operation, the valve remains in a closed position, meaning that no contents can flow though it when the plug 25 and eutectic plugs or pins 21 and 31 are inserted (and remain at a temperature below their eutectic point).

Additionally, the plug 25 is prevented from rotating with respect to the valve body 9 via the thread joint 15, 19 when under internal forces and hoop pressure that may occur within the storage tank by the anti-rotation eutectic plug or pin 21. The anti-rotational eutectic plug or pin 21 preferably has a high temperature melting point (approximately −280° F.+). When the pressure discharge valve is exposed to this temperature, the anti-rotational plugs 21, 23 will phase change from solid to liquid. This transformation in material property relieves the resistance to unthreading (rotation) by action exerted by the forces of the storage tank (weight of content—fuel and hoop pressures), thus allowing the solid plug 25 to rotate off flange 11 and effectively create an open valve.

The amount and size of the pressure discharge valves needs to be determined by the size and type of storage tank, i.e., whether it is a land storage tank or a tanker truck. Additionally, different storage tank contents require different sized pressure discharge valves. The storage tank contents can include fuel oil, gasoline, acids, liquefied gases, etc.

As an added safety feature, the pressure discharge valve 1 has a solid plug 25, a vent hole 27, and a vent eutectic 31. As mentioned above, the vent eutectic 31 is a means of sealing the vent hole 27 until a temperature is reached between the 160° degrees for the operating temperature and the 280° F., the temperature at which the pressure discharge valve 1 is in the open position (via rotation of the solid plug 25). The orientation of the vent hole is optional (forward, downward, upward, etc. . . . ). For example, vent hole 27 can be oriented to discharge sideways, i.e., from the side of the tank.

In such a case, a partial release of certain storage tank fluids can be used to warn firefighters of hazardous conditions. In this case, a small release of a flammable fuel oil or gasoline provides a visual warning to a firefighter near a burning storage tank that an explosion of the contents is imminent. This visual warning will allow the firefighter to stay in a burning area as long as possible without it being too hazardous. The temperature differential of the eutectic points of the vent eutectic 31 (as an example, 250° F.) versus the anti-rotation eutectic 21 (280° F.+), will afford the firefighter a sufficient time period to exit the burning area. This temperature differential between the vent eutectic 31 and the anti-rotation eutectic 21 can be adjusted to define or create specific desired time intervals, so as to create safer conditions for firefighters and first responders.

In addition to the vent eutectic 31 and anti-rotation eutectic plug or pin 33, as illustrated in FIGS. 4 and 5, in a preferred embodiment, a eutectic sodder material 35 is disposed between the plug 25 and the valve body 9. Preferably, the eutectic sodder material 35, which may be comprised of one or more of $Bi_{58}Pb_{42}$, $In_{52}Sn_{48}$, $In_{74}Cd_{26}$, and $In_{50}Sn_{50}$, is disposed adjacent the threads 19, such that when the eutectic sodder material reaches its eutectic point and changes phase (to a liquid), the eutectic sodder material 35 acts as a lubricant with relation to the plug 25 and valve body 9. Accordingly, the eutectic sodder material 35 is preferably comprised of a eutectic composition having a eutectic point higher than that of the vent eutectic 31, but lower than the anti-rotation eutectic plug or pin 33.

For example, in a preferred embodiment, the vent eutectic 31 has a eutectic point at or near 250° F., the eutectic solder material 35 has a eutectic point at or near 275° F., and the anti-rotation eutectic plug or pin 33 has a eutectic point at or near 290° F. Thus, in operation, when the internal temperature of a storage tank rises beyond normal operating ranges and reaches 250° F., the vent eutectic 31 is the first to change phase, providing a first warning of increasing temperature and pressure. Then, the eutectic solder material 35 changes phase when reaching a temperature of around 275° F., thereby releasing the plug 25 from tight engagement with the valve body 9 and lubricating the area therebetween. Finally, the anti-rotation eutectic plugs or pins 33 reach their eutectic point and change phase, thereby allowing the plug 25 to rotate via the threads 19, the rotation thereof aided by the lubrication provided by the eutectic solder material 35.

Additionally, in its solid state, the eutectic solder material (joint) disposed between flange 11 and solid plug 25, as shown in FIG. 4, or thread joint 19, acts as a sealing means, such that the fluid and/or gas contained within the storage tank does not leak through the valve assembly. This threaded joint can be partial (as shown), or it can extend to the anti-rotation eutectic plug or pin 21. In addition to the sealing properties provided by the eutectic solder material 35, the thread 19 itself provides additional mechanical strength properties to the threaded joint, as the eutectic solder material 25 is not generally strong enough on its own (without the threads) to maintain the plug in a fixed position under pressure.

To further improve the holding strength partially provided by the thread joint, the anti-rotation eutectic plugs or pins 21 are provided to resist the rotational forces exerted by the pressure loads on the solid plug 25. Moreover, the anti-rotation eutectic plugs or pins 21, which have a higher eutectic point than the eutectic solder material 35, ensure that the eutectic solder material 35 reaches a temperature sufficient to fully melt same (i.e., change phase from solid to liquid) prior to release of the plug (by the phase change of the anti-rotation eutectic plugs or pins 21. This important property/effect of the present invention ensures that not only is the thread joint lubricated prior to release of anti-rotational forces on the plug 25, but that the solid plug 25 is not canted until it is ready to unthread itself.

Another safety feature of the pressure discharge valve 1 is that the flange 11 can have piping disposed over it or in communication therewith such that when the solid plug 25 rotates off flange 11, the piping can then divert the storage tank contents to a safe location. As an example, fuel oil can be diverted to an "open" pool where there can be a controlled fire without the possibility of an explosion. Another example would be a safe location where there is no fire and the fuel can be recovered. In this case, the environmental clean-up cost could be greatly impacted (cost savings).

As far as a vehicle, a hose (not shown) can be attached to at least control the total amount of discharge. An example would be to attach a fire hose (usually carried by firefighters) and transfer the oil/gasoline to a receiving area away from the fire. The diversion of fuels is important for recovery potentials and also to minimize contamination. If the fuel can be recovered, it has a high dollar value versus an exploding storage tank which has no recovery value.

The present invention provides a valve system that initially warns firefighters of the fuel storage tank temperature. This feedback provides a field/tank temperature reading via the valve which, when safe to be near, has no indications of being open. As the temperature increases and approaches the critical point, valve 1 automatically discharges a small stream of fuel to warn firefighters (see FIG. 1). This fuel discharge can be either a controlled "squirting" of the fuel or an ignited fuel as a controlled fire ball to provide firefighters a visual indication that it is too dangerous to approach the storage tank.

After this warning signal, valve 1 then automatically goes into a discharge or open position mode to reduce the internal pressure in the storage tank. This mode disposes of the fuel from the storage tank, thus reducing the potential of a tank rupture which may be more dangerous than a fuel fire.

The valve 1 of the present invention achieves the objects of the invention by providing a mechanical thread lock valve 15, 19, flange 11, and solid plug 25; automatically providing a controlled warning fuel disposal via a vent hole 27; an anti-rotation feature using an anti-rotation eutectic plug or pin 21; and fuel disposal at a specific temperature.

Although specific embodiments of the present invention have been disclosed herein, those having ordinary skill in the art will understand that changes can be made to the specific embodiments without departing from the spirit and scope of the invention. Thus, the scope of the invention is not to be restricted to the specific embodiments. Furthermore, it is intended that the appended claims cover any and all such applications, modifications, and embodiments within the scope of the present invention.

LIST OF DRAWING ELEMENTS

1: pressure discharge valve
3: wall of a storage tank for flammable or explosive fuels
5: hole in storage tank wall 3
7: bore hole
9: valve body 9
11: flange
12: hole through flange 11
13: larger diameter of bore hole 7 through valve body 9
15: lower or entry end of bore hole 7
17: shoulder
19: threads (formed on an inner surface of the smaller diameter bore hole 15), forming a thread joint
21, 23: small bore holes
25: plug 25
27: vent hole
29: lower end of vent hole 27
31: eutectic plug or pin
33: anti-rotation plugs or pins
35: eutectic solder material

What is claimed is:

1. A pressure discharge valve for storage tanks comprising:
    a. valve body means having an outer or discharge end and a lower or entry end which is in contact with the storage tank, the valve body means having a through hole therein adapted to mate and communicate with a through hole in a wall of the storage tank;
    b. a first vent means which automatically provides a partial release of storage tank liquid at a first predetermined temperature lower than critical combustion and/or explosive temperatures of liquid in the storage tank, providing a visual signal and warning to firefighters of hazardous conditions that rupture of the storage tank or explosion of the liquid in the storage tank is imminent;
    c. a second vent means which automatically vents liquid in said storage tank through the hole in the valve body means when the liquids therein reach a predetermined critical temperature;
    d. a plug means adapted to be connected in threaded engagement with the valve body means, whereby to close the through hole therein until the temperature of fluids in the storage tank reaches a critical predetermined temperature; and
    e. a eutectic solder means disposed between the valve body means and first vent means, which changes upon reaching a predetermined critical temperature, thereby providing a lubrication effect between the valve body means and the first vent means;
    f. wherein a flange means is provided on the valve body means to aid in affixing the valve body means to the storage tank;
    g. wherein said first vent means further comprises a through vent hole in said plug means to facilitate a partial release of fluids from the storage tank to the atmosphere;
    h. wherein the vent hole in the first vent means is provided with a plug formed of a vent eutectic which seals the vent hole until a first predetermined temperature is reached when it becomes necessary to warn firefighters of hazardous temperatures in the storage tank;

i. wherein said vent eutectic changes from a solid to a liquid over a predetermined temperature range, thereby melting the solid plug from the vent hole which results in a partial release of liquids from said first vent means;

j. wherein the vent eutectic is selected from the group consisting of $Bi_{58}Pb_{42}$, $In_{52}Sn_{48}$, $In_{74}Cd_{26}$, and $In_{50}Sn_{50}$; and k. wherein the valve body means has a round through hole which has a smaller diameter in contact with the storage tank than at the discharge end of the pressure valve, and a shoulder formed where the diameter of the through hole becomes larger.

2. The pressure discharge valve of claim 1, wherein the smaller discharge hole in the valve body means is threaded.

3. The pressure discharge valve of claim 2, wherein said plug means conforms in size and shape to the round through hole in the valve body means, and fits in sealing engagement therewith when in threaded engagement with the valve body means, and when a shoulder on the through hole of the valve body means is in sealing engagement with a corresponding shoulder formed on the plug means.

4. The pressure discharge valve of claim 1, wherein said second vent means further comprises a hole extending through the valve body means and into said plug means.

5. The pressure discharge valve of claim 4, wherein said second vent means further comprises an anti-rotational solid plug in the hole extending through the valve body means and into the plug means, said anti-rotational solid plug changes phase from solid to liquid when liquid in the storage tank reaches a predetermined critical temperature, at which time internal pressure in the storage tank causes the plug means to rotate until no longer in threaded engagement with the valve body means and forced out of the valve body means, thus fully opening the valve and relieving excess pressure in the storage tank.

6. The pressure discharge valve of claim 5, wherein the solid anti-rotational plug is formed from a eutectic composition selected from the group consisting of $Bi_{58}Sn_{42}$, $Bi_{57}Sn_{42}Ag_1$, and $Sn_{51.2}Pb_{30.6}Cd_{18.2}$.

7. A pressure discharge valve for storage tanks comprising:
a. valve body means having an outer or discharge end and a lower or entry end which is in contact with the storage tank, the valve body means having a through hole therein adapted to mate and communicate with a through hole in a wall of the storage tank;
b. a first vent means which automatically provides a partial release of storage tank liquids at a first predetermined temperature lower than critical combustion and/or explosive temperatures of said liquids in the storage tank, providing a visual signal and warning to firefighters of hazardous conditions that rupture of the storage tank or explosion of liquid In the storage tank is imminent;
c. a second vent means which automatically vents liquid in said storage tank through the hole in the valve body means when the liquid in the storage tank reaches a predetermined critical temperature, and
d. a plug means adapted to be connected in threaded engagement with the valve body means, whereby to close the through hole therein until the temperature of fluid in the storage tank reaches a critical temperature, said first vent means further comprising a vent hole extending through said plug means to facilitate a partial release of fluids from the storage tank to the atmosphere, the vent hole in the first vent means being provided with a plug formed of a vent eutectic which seals the vent hole until a first predetermined temperature is reached when it becomes necessary to warn firefighters of hazardous temperatures in the storage tank, said vent eutectic changing from a solid to a liquid over a predetermined narrow temperature range, thereby melting the solid plug from the vent hole which results in a partial release of liquids from said first vent means, said valve body means having a round through hole which has a smaller diameter in contact with the storage tank than at the discharge end of the pressure valve, with a shoulder being formed where the diameter of the through hole becomes larger, the smaller discharge hole in the valve body means being threaded, said plug means conforming in size and shape to the round through hole in the valve body means, and fitting in sealing engagement therewith when in threaded engagement with the valve body means when a shoulder on the through hole of the valve body means is in sealing engagement with a corresponding shoulder formed on the plug means, said second vent means further comprising a hole extending through the valve body means and into said plug means, said second vent means further comprising an anti-rotational solid plug in the hole extending through the valve body means and into the plug means, said anti-rotational solid plug changing phase from solid to liquid when the liquid in the storage tank reaches a predetermined critical temperature, at which time internal pressure in the storage tank causes the plug means to rotate until no longer in threaded engagement with the valve body means and is forced out of the valve body means, thus fully opening the valve and relieving excess pressure in the storage tank.

8. The pressure discharge valve of claim 7, wherein the vent eutectic is selected from the group consisting of $Bi_{58}Pb_{42}$, $In_{52}Sn_{48}$, $In_{74}Cd_{26}$, and $In_{50}Sn_{50}$.

9. The pressure discharge valve of claim 7, wherein the solid anti-rotational plug is formed from a eutectic composition selected from the group consisting of $Bi_{58}Sn_{42}$, $Bi_{57}Sn_{42}Ag_1$, and $Sn_{50.2}Pb_{30.6}Cd_{18.2}$.

10. The pressure discharge valve of claim 7, further comprising a eutectic solder material disposed between the plug means and the valve body, said eutectic solder material having a eutectic point between a eutectic point of the vent eutectic and a eutectic point of the anti-rotational solid plug.

11. The pressure discharge valve of claim 7, wherein a flange means is provided on the valve body means to aid in affixing the valve body means to the storage tank.

12. A pressure discharge valve for storage tanks comprising: a valve body having an outwardly extending flange at a base of the body, said flange adapted to mount the valve on to a surface of a storage tank, said circular body having a round bore hole therein concentric with a longitudinal axis of the circular body, said circular bore hole having a larger diameter in an upper portion of the circular body than in a lower portion of the circular body, with a shoulder being formed in the bore hole where the diameter of the bore hole changes, an inside surface of the lower bore hole having threads formed therein, and one or more bore holes being formed in the circular body perpendicular to the longitudinal axis of the circular body, a solid plug having a larger diameter at a top portion than at a lower portion and being adapted to fit in sealing engagement with surfaces of the bore hole formed in the circular body, said plug having threads formed on a lower portion thereof which are adapted to operate in threaded engagement with threads on a lower portion of the bore hole in the circular body, a second bore hole formed in the solid plug which is in coincidence and alignment with said bore hole formed in an upper portion of the circular body; and a solid anti-rotation eutectic pin inserted in the second bore hole so as to prevent rotation of the plug at safe temperatures, said anti-rotation eutectic pin automatically changing phase to a liquid at critical temperature to release the plug and permit the plug to rotate upwardly and out of threaded engagement with the valve body whereby to open the valve, said plug having a small through hole extending from the tank wall with a first eutectic plug or pin in sealing engagement therein, said eutectic plug or pin being solid at safe temperature conditions but changing phase to a liquid at or near critical conditions whereby to release a small stream of liquid to warn firefighters of imminent danger.

* * * * *